May 23, 1961
C. KWISNEK
2,984,929
HARNESS FOR LIVE MINNOWS
Filed Aug. 2, 1957
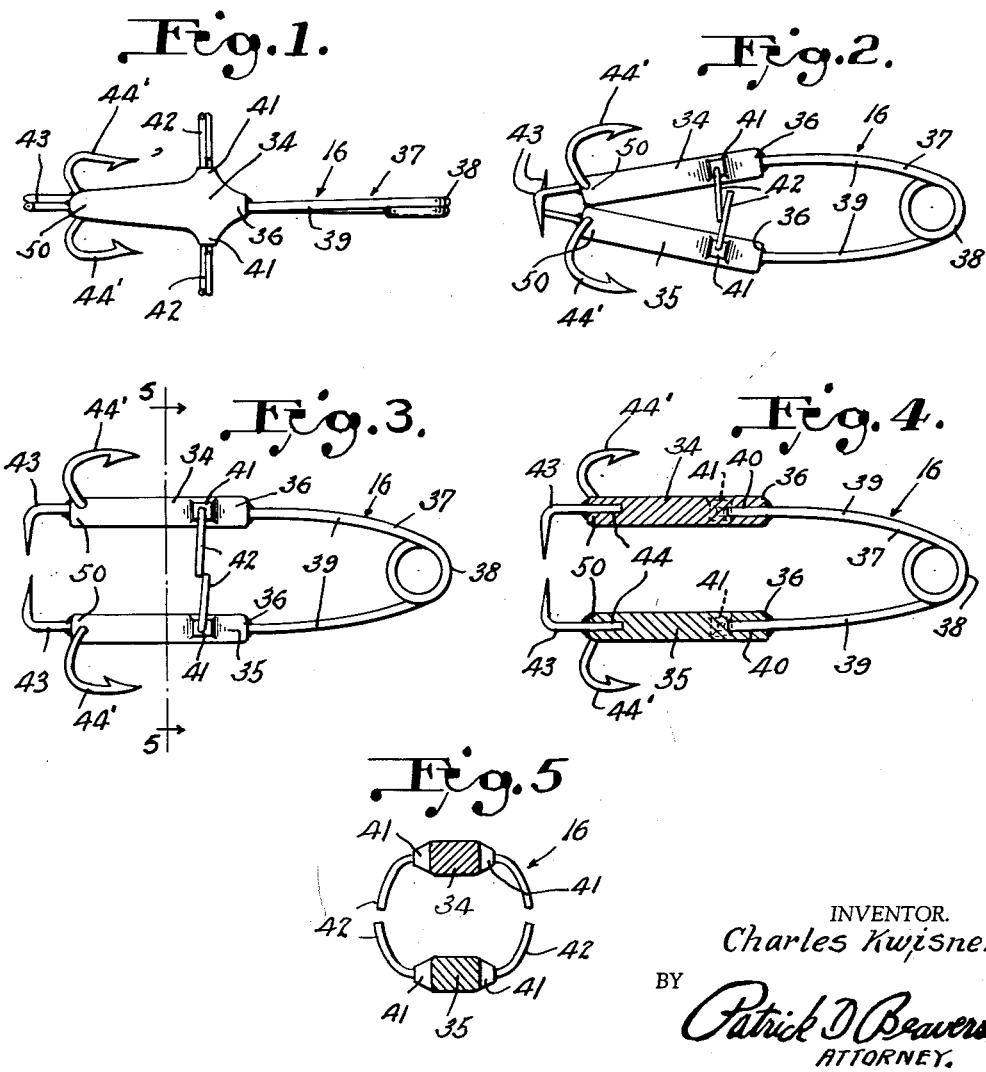
INVENTOR.
Charles Kwisnek
BY Patrick D. Beavers
ATTORNEY.

United States Patent Office 2,984,929
Patented May 23, 1961

2,984,929

HARNESS FOR LIVE MINNOWS

Charles Kwisnek, R.D. 1, Box 157, Blairsville, Pa.

Filed Aug. 2, 1957, Ser. No. 675,926

1 Claim. (Cl. 43—44.6)

This invention relates to improvements in a harness for live minnows.

An object of the invention is to provide a harness for a live minnow that when placed on the live minnow will provide an efficient fish lure.

Many fishermen use live bait for fishing, but it is difficult to provide a harness which will hold a live minnow without killing or damaging it so that its usefulness as fish bait is ended. However, with the use of the present invention the live minnow will not be killed and will, when the harness is positioned thereon, provide an efficient fish lure.

Another object of the invention is to provide a harness that will efficiently retain the live minnow in the harness by spring action and an applicator which will overcome the spring action of the harness so that it can be placed on the live minnow.

With the above and other objects and advantages in view, the invention consists of the novel details of construction, arrangement and combination of parts more fully hereinafter described, claimed and illustrated in the accompanying drawings, in which:

Fig. 1 is an elevational view of one form of harness to be placed on a live minnow;

Fig. 2 is a side view of the harness of Fig. 1 in collapsed position;

Fig. 3 is a side view of the harness of Fig. 1 in expanded position ready to receive a minnow;

Fig. 4 is a longitudinal sectional view of the harness; and

Fig. 5 is a vertical sectional view on the line 5—5 of Fig. 3.

Referring more in detail to the drawings, wherein like parts are designated by like reference numerals, the reference numeral 16 is used to generally designate a harness to be applied to a live minnow.

The harness 16 comprises identically shaped body portions 34 and 35, with each body portion 34 and 35 having a neck portion 36. A U-shaped compression spring 37 having a coil 38, has the ends 39 thereof received in sockets 40 in the neck portions 36 of the body portions 34 and 35 to position the body portions in opposed relation to each other.

Apertured bosses 41 are formed on the sides of the body portions 34 and 35 in diametrically opposed relation to each other and an L-shaped gripping spring member 42 is positioned at one end in each of the bosses 41. The gripping members 42 extend toward the body portions 34 and 35 that they are not attached to so that when a live minnow is not positioned between the body portions 34 and 35 they will be in overlapped relation to each other as shown in Fig. 2.

An inwardly directed penetrating prong 43 is mounted in a socket 44 in the curved tail end 50 of each of the body portions 34 and 35, when the harness is in position, as shown in Fig. 2, they will overlap each other as shown, but when the harness is applied to a live minnow, they will penetrate the sides of the live minnow.

A pair of outwardly directed oppositely curved fish hooks 44' are mounted in each of the ends 50 of the body portions 34 and 35 and are positioned on a side of the body portions adjacent the end portion to which the penetrating prongs 43 are attached.

When it is desired to apply the harness 16 to a live minnow, the body portions 34 and 35 will be moved away from each other.

When the live minnow is in place, the spring action of the harness 16 will cause it to grip the live minnow. The prongs 43 will enter the live minnow to retain the harness 16 on the live minnow. The live minnow is released with the harness in place thereon.

The harness 16 is placed on the minnow while it is in the water in the container for the live minnows, thus the minnow never leaves the water, is not exposed to the air and will thus live longer.

The harness 16 may have double hooks, as shown, may have single hooks or may have single hooks and weed guards as desired. If desired, the penetrating prongs may also be eliminated and the harness retained on the live minnow by spring action.

It is believed that from the foregoing description the structure and operation of the invention will be apparent to those skilled in the art and it is to be understood that changes in the minor details of construction, arrangement and combination of parts may be resorted to provided they fall within the spirit of the invention and the scope of the appended claims.

Having thus described the invention what is claimed as new and desired to be secured by Letters Patent is:

A harness for a live minnow comprising a pair of body portions of rectangular cross-section, each of said body portions having a neck portion at one end thereof and the sides of each body portion having an apertured boss thereon adjacent the inner end of said neck portion, said apertured bosses extending outwardly of said sides in diametrically opposed relation to each other, a U-shaped compression spring having the ends thereof extended into said neck portions and positioning the body portions in opposed relation to each other, penetrating prongs on the opposite end of each body portion, a pair of fish hooks on the same sides of said body portions as said apertured bosses and extending in opposite directions from said penetrating prongs and spring gripping members extended into said apertured bosses and positioned on the opposite sides of each of said body portions.

References Cited in the file of this patent

UNITED STATES PATENTS

| | | |
|---|---|---|
| 590,401 | Morgan | Sept. 21, 1897 |
| 1,386,061 | Johnson | Aug. 2, 1921 |
| 2,264,391 | MacLeod | Dec. 2, 1941 |
| 2,455,165 | Feitl | Nov. 30, 1948 |
| 2,618,097 | Johnstone | Nov. 18, 1952 |
| 2,741,060 | Rowlance | Apr. 10, 1956 |

FOREIGN PATENTS

| | | |
|---|---|---|
| 51,227 | Sweden | Mar. 15, 1922 |
| 336,483 | France | Jan. 16, 1904 |
| 906,476 | France | May 14, 1945 |